United States Patent [19]

Sanderson

[11] 4,451,198

[45] May 29, 1984

[54] MATERIAL HANDLING DEVICE

[76] Inventor: Edward T. Sanderson, 22552 Arquilla, Richton Park, Ill. 60471

[21] Appl. No.: 924,972

[22] Filed: Jul. 17, 1978

[51] Int. Cl.$^3$ .............................................. B65G 7/08

[52] U.S. Cl. .................................. 414/779; 294/67 C; 414/684; 414/728; 414/908; 414/911

[58] Field of Search ............... 414/420, 421, 425, 680, 414/908, 684, 911, 728, 910, 742, 731, 764, 766, 765, 768, 769, 770, 774, 779, 782, 783; 294/94-97, 67 C, 67 R

[56] References Cited

U.S. PATENT DOCUMENTS 1,437,547 12/1922 Pope .
1,614,400 1/1927 Selman et al. .
2,135,890 11/1938 Gedge, Jr. .
2,526,725 10/1950 Bronson .
2,630,931 3/1953 Douglas .
2,703,252 3/1955 Blackwell .
2,711,832 6/1955 Cigliano .
4,127,199 11/1978 Clethero ........................ 414/728 X

FOREIGN PATENT DOCUMENTS 1498038 9/1967 France .

*Primary Examiner*—Frank E. Werner

[57] ABSTRACT

A device for handling coils of flat material, as for example coiled steel, including a carrying mechanism attachable to a crane having a coil securing frame thereon including a holding fixture which can be inserted through the coil and being pivotal whereby the coil may be oriented in either a horizontal or vertical plane whereby the coils may be stored or picked up in a vertical stacking arrangement.

2 Claims, 7 Drawing Figures

MATERIAL HANDLING DEVICE

SUMMARY OF THE INVENTION

It has been known it is highly advantageous to stack large coiled flat materials such as steel in a vertical arrangement; that is, vertical in a sense that an axis through the center of the coil parallel with the plane of the coil would be vertical. This is desirable in that when coils are stored in the horizontal plane, after periods of time they will deform to a certain extent affecting the quality of the steel and the shape of the coil. In addition, a safety hazard is present in horizontal stacking in that the coils have a natural tendency to roll apart due to the weight of one coil on top of another, and if a blocking mechanism for the stack fails, the stack can roll apart injuring workers in the vicinity. For these reasons, it is desirable that the coils be stacked in the vertical plane.

It is difficult to stack in the vertical plane in that the normal crane device or handling mechanism for a coil is made to be usable only with the coil transported in its horizontal plane and also in view of the fact that the trucking industry carries coils in the horizontal position.

The present invention obviates these difficulties in that the attachment device for a crane is adapted to provide a pivoted arrangement whereby the coil can be transported, picked up and released in either a horizontal or vertical plane. Associated with the pivotal frame mechanism for accomplishing this purpose is a unique floor mounted pivoting device whereby an operator of the crane may without assistance change the position of the coil from a horizontal to a vertical plane or vice-versa.

BRIEF DESCRIPTION OF THE INVENTION

Figure 1:
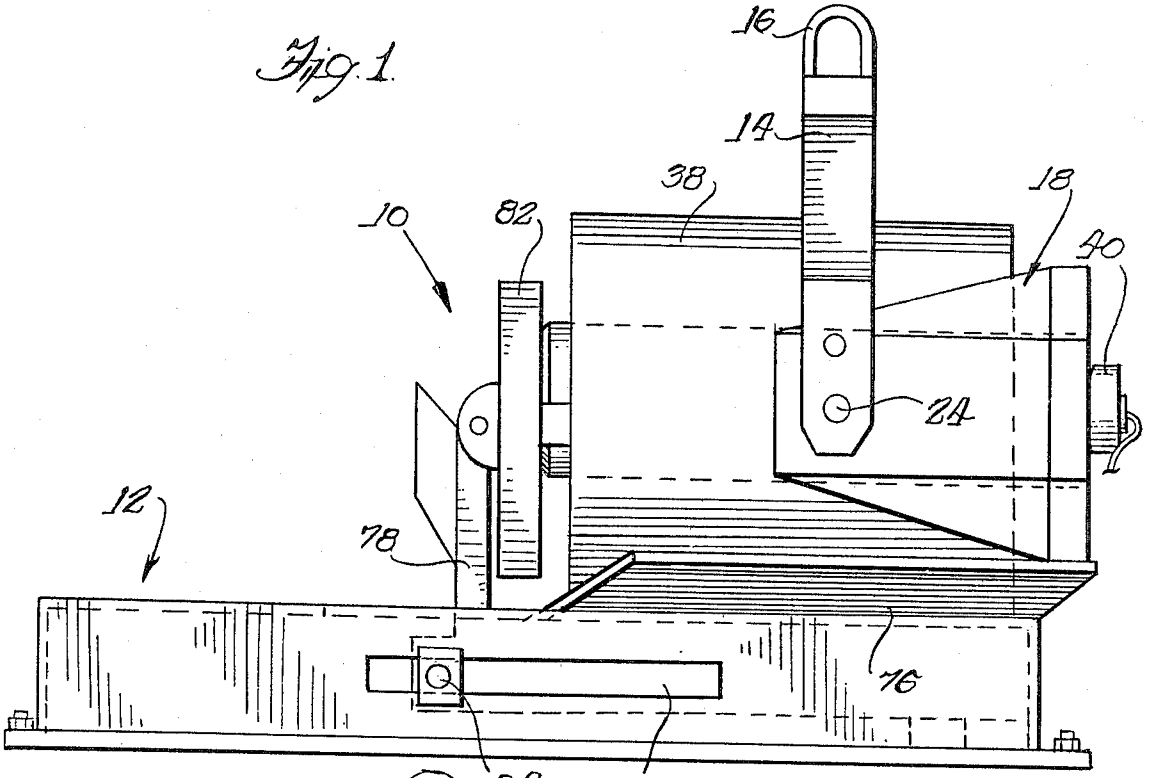
FIG. 1 is a plan view of the material handling device of the present invention.
Figure 4:
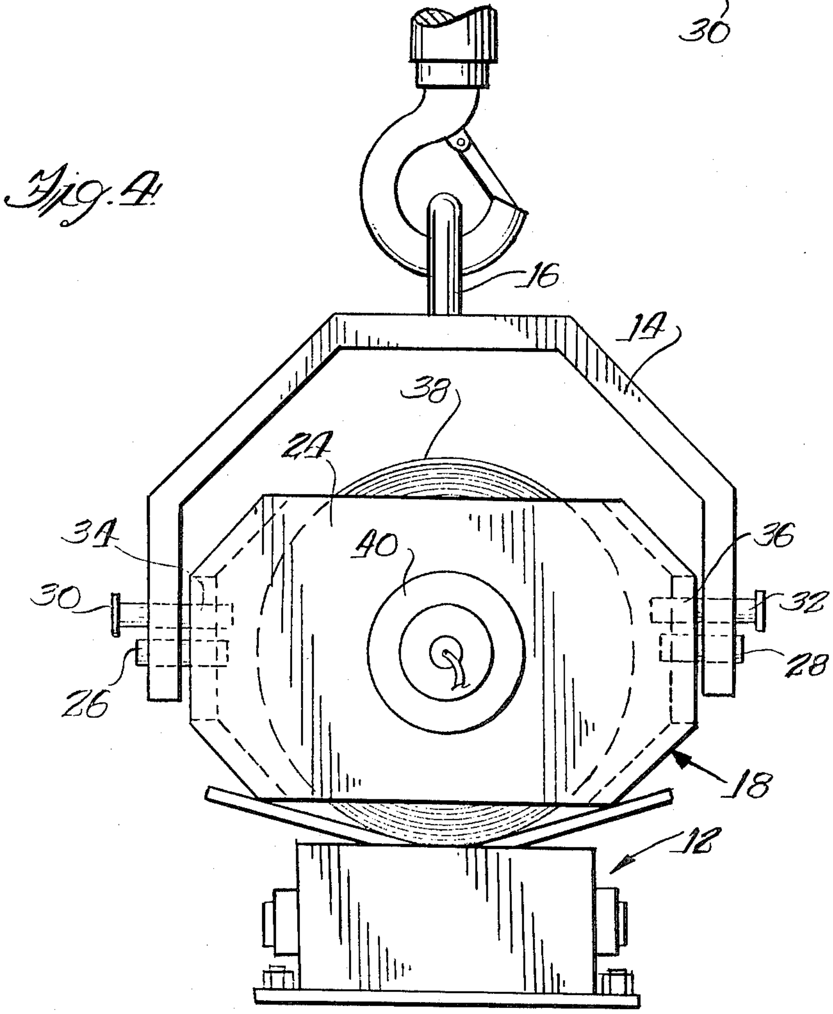
FIG. 4 is an end view of the device of FIG. 1.
Figure 5:
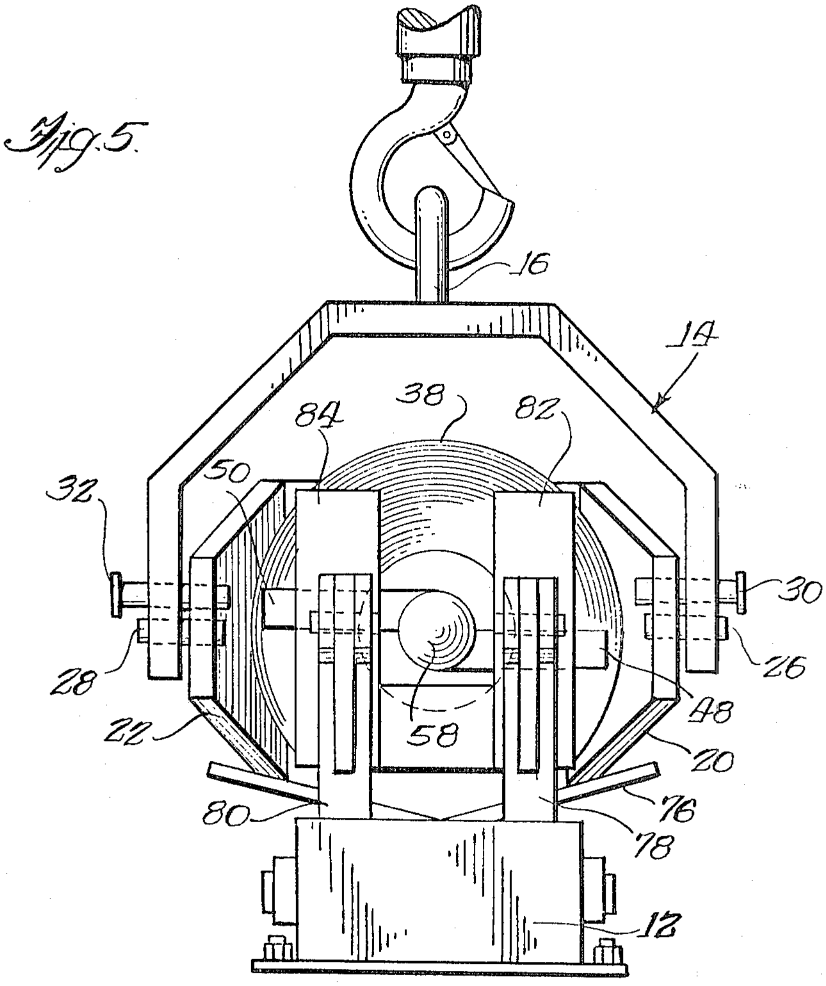
FIG. 5 is an opposite end view device of FIG. 1.

Referring to FIG. 1, the unique coiled material handling device 10 is illustrated in its operative association with the floor mounted pivoting mechanism 12. The device 10 comprises a U-shaped support 14 having a steel loop 16 thereon for attachment to a crane device. The support 14 has freely pivotally connected thereto a frame 18 which is generally U-shaped having arms 20 and 22 and a support plate 24. The arms 20 and 22 are connected to the support 14 by pivot pins 26 and 28 respectively, as better illustrated in FIG. 4. Pins 30 and 32 are also provided in support 14. The pins 30 and 32 are adapted to be engaged in matching holes 34 and 36 in arms 20 and 22 respectively, as will be described.

Figure 6:
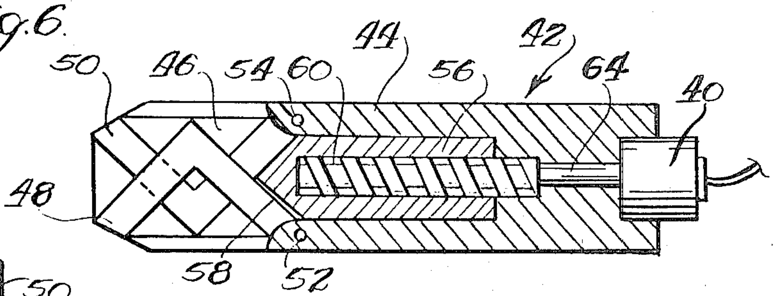
FIG. 6 is a partial cross-sectional view of the locking device of the present invention shown in retracted positon.
Figure 7:
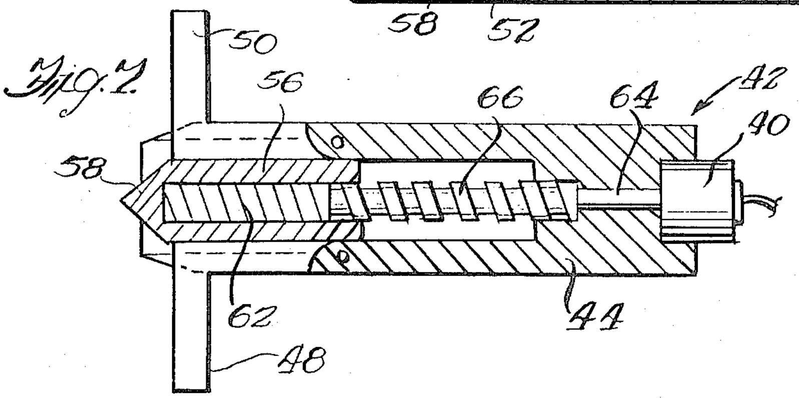
FIG. 7 is a view similar to FIG. 6 showing the locking device in the extended position.

Referring again to FIG. 1, the device 18 also includes a securing mechanism to secure a coil of material as, for example, the coil 38 within the device 10. This mechanism includes an electric motor 40 attached to plate 24. The electric motor 40 is adapted to actuate a device 42 illustrated in FIG. 6. The device 42 is comprised of a cylinder 44 having contained within a bore 46 a pair of locking arms 48 and 50. The locking arms 48 and 50 are pivoted to the cylinder 44 and 52 and 54 respectively. An actuator 56 is provided which has a pointed nose portion 58 thereon and an internal bore 60. Internal bore 60 has incorporated therein a screw thread 62. The electric motor 40 has attached thereto a drive shaft 64 adapted to be rotated thereby which has provided thereon screw threads 66 which mate within the screw threads 62 of actuator 56. As will be apparent, the device is shown in its retracted position in FIG. 6 wherein the shaft 64 has been rotated such that actuator 56 is in its fully retracted position toward electric motor 40. A spring device in this instance (not illustrated) which may be incorporated in the pivots 52 and 54 can thus retract the arms 48 and 50. However, when the electric motor 40 is actuated in a direction to rotate shaft 64 such that the screw threads will move actuator 56 outwardly of the cylinder as illustrated in FIG 7, nose portion 58 of the cylinder of the actuator 56 will push locking arms 50 and 48 into their extended or locking position illustrated in FIG. 7.

Referring now to FIGS. 1, 2, 3, 4 and 5, the frame pivoting mechanism 12 is comprised of a pair of side rails 70 and 72 on which is pivotally and slidably mounted a cradle mechanism 74. The cradle mechanism 74 has a V-shaped support 76 thereon in which the coil 38 can rest as illustrated in FIG. 1. The support 76 shown horizontal in FIG. 1 also includes a pair of end supports 78 and 80 which extend at right angles to the support 76. Pivotally mounted to the supports 78 and 80 are a pair of contact plates 82 and 84 respectively which are adapted to contact the end of coil 38 as illustrated in FIG. 1. The mechanism 74 is pivotally connected to the frame member 70 and 72. This is accomplished by having a pair of sliding bolts 90 and 92 secured to the frames 70 and 72. Bolts 90 and 92 accommodate a pair of pins 94 and 96, respectively, which are received within slots 98 and 100 provided within the frames 70 and 72.

Figure 2:
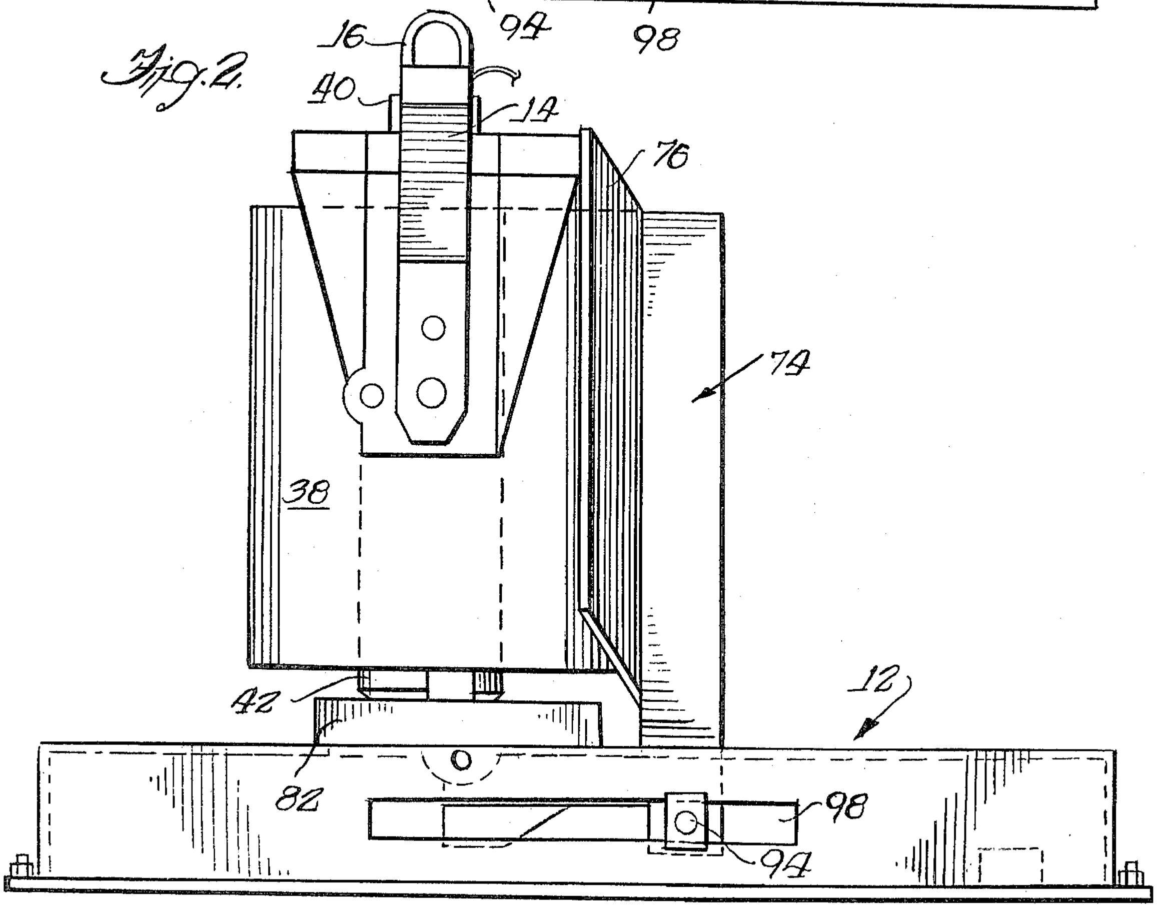
FIG. 2 is a view similar to FIG. 1 showing the device arranged for vertical arrangement of the coil material.
Figure 3:
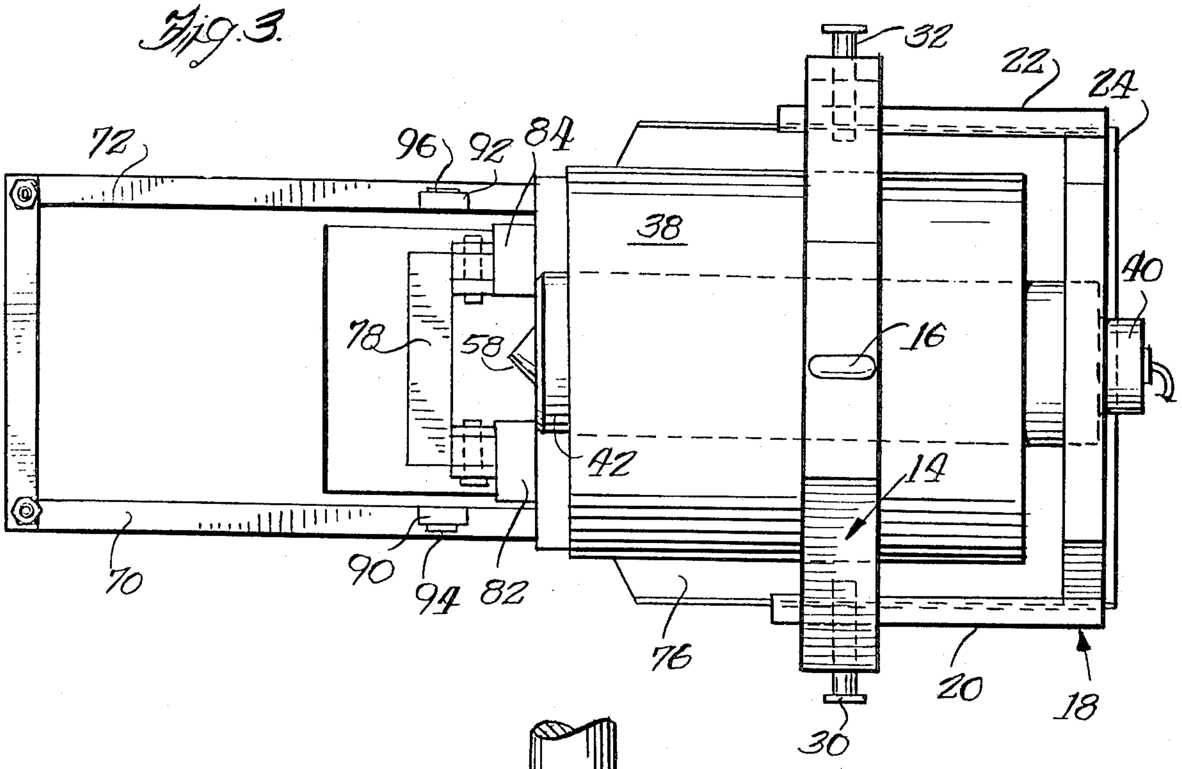
FIG. 3 is a top view of the mechanism disclosed in FIG. 1.

The operation of the device of the present invention is as follows. As shown in FIG. 2, a coil 38 is in the vertical plane in the device 12. If the coil was standing on a pair of two by fours or other supports in a storage area or is vertical in device 12, the crane is first moved above the coil 38. The weight of the frame 18 and the locking mechanism 42 is such that 18 and 42 will swing to the vertical position illustrated in FIG. 2 under such weight. Thus, the crane need only be lowered in a position similar to FIG. 2, in which the cylinder 44 will travel through the center of the coil and the arms 20 and 22 will move over the coil in a manner best seen in FIG. 3 until the plate 24 is in contact or close to engaging with the coil 38. At this time, the locking arms 40 and 50 will be in the retracted position as illustrated in FIG. 6. The motor 40 is then actuated which moves the arms 50 and 48 to the extended or locking position shown in FIG. 7 which moves the lock arms to a position where they may engage with the end of the coil as illustrated in FIG. 2. Now the crane may pick up the coil and transport it in the vertical orientation. Due to the weight of the coil and the mechanism herein described, the coil will stay in the vertical orientation illustrated in FIG. 2.

If it is necessary to change the orientation of the coil to the horizontal position, the operator may move the coil to the device 12, plates 82 and 84 will be in an angular position such that it may be approached with the coil in vertical or horizontal disposition and the coil is moved onto the device such that the locking arm end of the coil as it touches and engages with contact plates 82 and 84 and the coil generally is touching the support 76. With the coil in this orientation, the crane may be actuated to pull the device to the right, for example, as illustrated in FIG. 2 which will pivot the frame work 74 to pivot the coil to its horizontal position illustrated in FIG. 1, the sliding connection in slots 98 and 100 assisting in this pivoting motion. When the device is in the orientation in FIG. 1 with the coil 38 horizontal, the pins 30 and 32 can be slid into engagement with mating holes 34 and 36 in the arms 20 and 22 of frame 18, thus locking the coil in the horizontal position with respect to support 14 as illustrated in FIG. 1. Then the coil can be moved, transported or placed anywhere in a horizontal position if required. If it is desired to reorient the coil in the vertical position of FIG. 2, the device need only be returned to frame work 12 and the coil dropped down into position on cradle 76 as illustrated in FIG. 1, the pins 30 and 32 retracted and the crane actuated to lift upwardly which will allow the weight of the coil and the handling device to pivot to the vertical position of FIG. 2 again.

Thus, from the above it will be clear that the present invention provides a unique and advantageous material handling device which can be used to pick up coils which are stacked in th vertical position or may be used to change coils from a vertical to a horizontal position or which may be used to transfer coils in either a horizontal or vertical position and includes an associated floor mounted pivot mechanism 12 by means of which a single operates solely by use of gravity, can reorient the coil from vertical to horizontal positions or vice-versa, due to the cooperation of the free pivot of frame 18 in support 14 of the pivoting and sliding movement of cradle 74 in side rails 70 and 72 of mechanism 12.

I claim:

1. A material handling device for a crane mechanism comprising a generally "U" shaped support, connectable to said crane mechanism, a frame also generally "U" shaped and pivot means connected to said frame and support whereby said frame is freely pivoted within said support, securing means on said frame adapted to be inserted through the center of a coil of material, a pair of securing arms within said securing means, actuating mechanism operative to extend said arms whereby said arms can engage an end of the coil for transport of said coil material when said device is connected to said crane mechanism, said pivot means being so designed that said coil can be changed from a vertical to a horizontal position and vice-versa using the weight of the coil, said device including a floor mounted pivoting mechanism including a pair of horizontal and stationary rails pivotally and slidingly supporting a coil cradle, said cradle engaging the surface of the coil and said securing means whereby said pivoting mechanism is usable to change the orientation of said coil from horizontal to vertical and vice-versa without damage to the coil solely by use of gravity and the crane mechanism by cooperation of the free pivot of said frame and the sliding and pivoting mounting of the cradle in said rails.

2. A device as claimed in claim 1 wherein said actuating mechanism includes an electric motor, a rotating member in engagement with said arms and movable by said electric motor to extend or retract said arms and said arms extending and supporting substantially the entire width of the material of said coil.

* * * * *